(12) United States Patent
Huckins

(10) Patent No.: US 7,072,955 B1
(45) Date of Patent: Jul. 4, 2006

(54) CONTROLLING REMOTE STORAGE DEVICES

(75) Inventor: Jeffrey L. Huckins, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1033 days.

(21) Appl. No.: 09/652,690

(22) Filed: Aug. 31, 2000

(51) Int. Cl.
*G06F 15/173* (2006.01)

(52) U.S. Cl. ..................... 709/223; 709/203

(58) Field of Classification Search ............... 709/203, 709/223–224, 228, 226, 231, 230, 220, 227, 709/217, 245, 238; 707/10; 725/115, 118; 370/390, 471; 715/115
See application file for complete search history.

(56) References Cited

U.S. PATENT DOCUMENTS

| | | | | |
|---|---|---|---|---|
| 5,561,637 A * | 10/1996 | Dan et al. | ............... | 365/230.03 |
| 5,663,757 A | 9/1997 | Morales | | |
| 5,742,759 A * | 4/1998 | Nessett et al. | ............... | 713/201 |
| 5,767,893 A | 6/1998 | Chen et al. | | |
| 5,798,785 A | 8/1998 | Hendricks et al. | | |
| 5,933,605 A * | 8/1999 | Kawano et al. | ............. | 709/238 |
| 6,008,802 A * | 12/1999 | Iki et al. | ...................... | 715/721 |
| 6,032,180 A * | 2/2000 | Nishikawa | .................. | 725/115 |
| 6,078,954 A * | 6/2000 | Lakey et al. | ................ | 709/223 |
| 6,104,871 A * | 8/2000 | Badovinatz et al. | ........ | 709/100 |
| 6,108,706 A * | 8/2000 | Birdwell et al. | ............ | 709/229 |
| 6,138,120 A * | 10/2000 | Gongwer et al. | ............ | 707/10 |
| 6,192,417 B1 * | 2/2001 | Block et al. | ................. | 709/249 |
| 6,211,901 B1 * | 4/2001 | Imajima et al. | ............... | 725/93 |
| 6,219,708 B1 * | 4/2001 | Martenson | .................. | 709/226 |
| 6,259,701 B1 * | 7/2001 | Shur et al. | .................... | 370/401 |
| 6,275,849 B1 * | 8/2001 | Ludwig | ...................... | 709/206 |
| 6,330,611 B1 * | 12/2001 | Itoh et al. | .................... | 709/229 |
| 6,389,432 B1 * | 5/2002 | Pothapragada et al. | ..... | 707/205 |
| 6,430,611 B1 * | 8/2002 | Kita et al. | ................... | 709/223 |
| 6,434,680 B1 * | 8/2002 | Belknap et al. | ............. | 711/161 |
| 6,438,648 B1 * | 8/2002 | McKean et al. | ............. | 711/114 |
| 6,449,607 B1 * | 9/2002 | Tomita et al. | ................. | 707/3 |
| 6,477,708 B1 * | 11/2002 | Sawa | .......................... | 725/116 |
| 6,490,586 B1 * | 12/2002 | Goft et al. | .................... | 707/10 |
| 6,493,750 B1 * | 12/2002 | Mathew et al. | ............. | 709/220 |
| 6,539,022 B1 * | 3/2003 | Virgile | ....................... | 370/401 |
| 6,543,053 B1 * | 4/2003 | Li et al. | ....................... | 725/88 |
| 6,567,851 B1 * | 5/2003 | Kobayashi | .................. | 709/228 |

(Continued)

FOREIGN PATENT DOCUMENTS

JP 61-99439 5/1986

(Continued)

OTHER PUBLICATIONS

T. Kurioka et al., *Television Home Server For Integrated Services—Toward The Realization Of ISDB Anytime Services*, IEEE Transactions On Consumer Electronics, IEEEInc., New York,, vol. 44, No. 4, Nov. 1998, pp. 1195-1999.

(Continued)

*Primary Examiner*—Abdullahi Salad
(74) *Attorney, Agent, or Firm*—Trop, Pruner & Hu, P.C.

(57) ABSTRACT

A messaging system may enable a server to assign unique identifiers to a plurality of clients. These identifiers enable a client to determine whether a message is specifically targeted to that client or, as an alternative, whether the client is a member of a group of targeted clients. A server may send messages containing an identifier to agents on one or more clients. The identifier may specify commands to control the storage of information on one or more clients.

19 Claims, 3 Drawing Sheets

U.S. PATENT DOCUMENTS

| | | | |
|---|---|---|---|
| 6,570,875 B1 * | 5/2003 | Hegde | 370/389 |
| 6,633,962 B1 * | 10/2003 | Burton et al. | 711/163 |
| 6,718,372 B1 * | 4/2004 | Bober | 709/217 |
| 6,725,264 B1 * | 4/2004 | Christy | 709/225 |
| 2002/0188626 A1 * | 12/2002 | Tomita et al. | 707/205 |

FOREIGN PATENT DOCUMENTS

| | | |
|---|---|---|
| JP | 63-95749 | 4/1988 |
| JP | 3-231536 | 10/1991 |
| JP | 2000-69513 | 3/2000 |

OTHER PUBLICATIONS

J.P. Evain, *The Multimedia Home Platform*, EBU Review—Technical, European Broadcasting Union, Brussels, BE, No. 275, Mar. 1998, pp. 4-10.

* cited by examiner

CONTROLLING REMOTE STORAGE DEVICES

BACKGROUND

This invention relates generally to controlling storage devices in multicast networks.

A multicast network may enable messages to be sent to a target group of clients that constitute a subset of all of the networked clients. Generally, multicasting is accomplished by including, within a header for example, the addresses of all the subject clients that are addressed.

In some multicasting environments, it may desirable to control the storage devices, such as hard disk drives, of targeted clients. As examples, a server or head-end of a multicast system may determine what information is stored on one or more clients' storage devices. This head-end control may be done with the consent of the client's owner. Thus, the server can determine how to effectively utilize the available disk space on a given client. In some cases, the server may also, in effect, sell or lease access to the available storage space on clients whose storage devices are controlled by the server or head-end.

Thus, there is a need for ways to control the storage devices of one or more clients either individually or as a group in a multicast environment.

DETAILED DESCRIPTION

Figure 1:
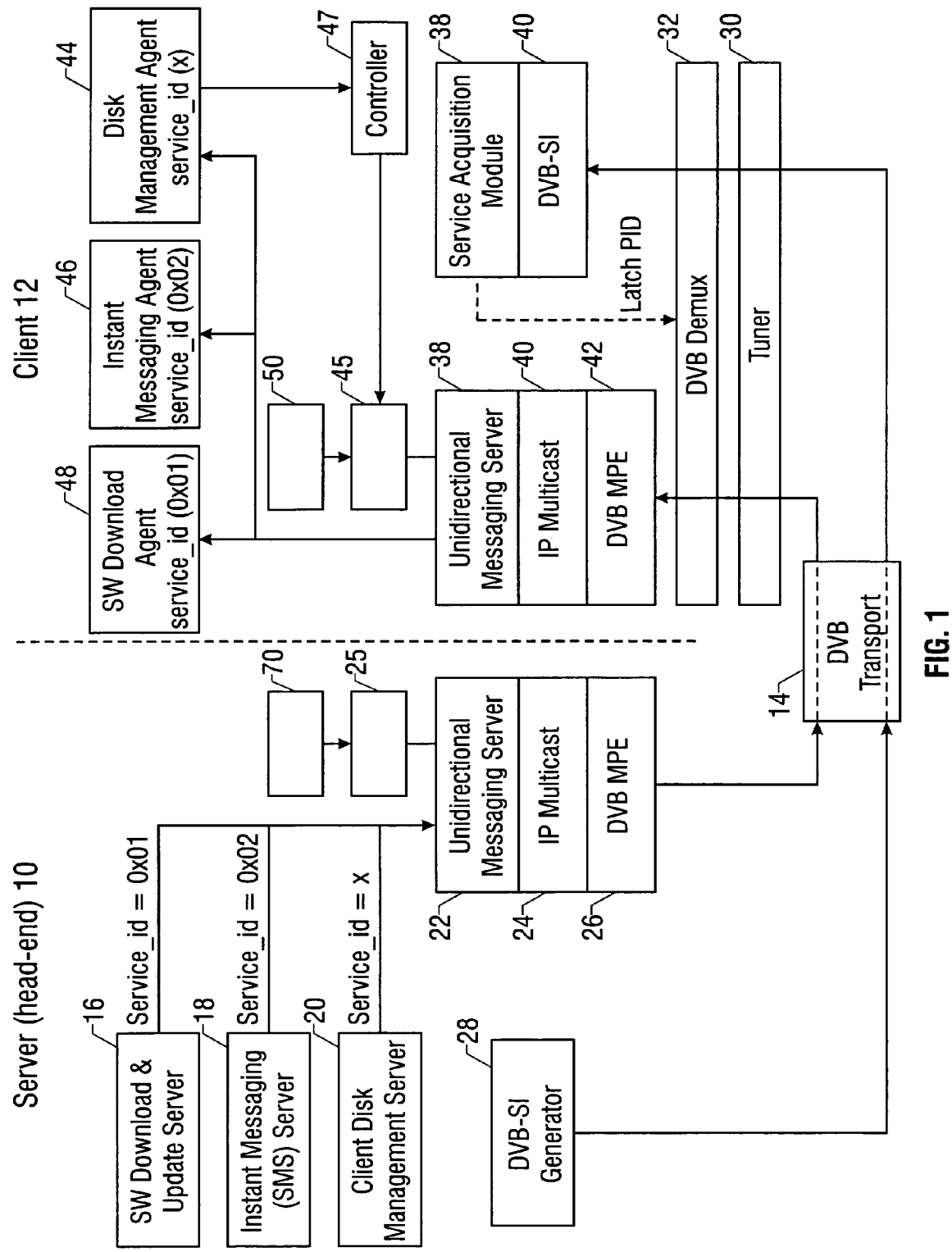
FIG. 1 is a schematic depiction of one embodiment of the present invention.

Referring to FIG. 1, a network may include at least one server or head-end 10 and a plurality of clients 12 (only one of which is shown). The server 10 may be coupled to a plurality of clients (including the client 12) through a distribution system that may be based on a wired system or a wireless or broadcast system. Examples of such networks include television distribution networks such as digital video broadcasting systems.

In one embodiment of the present invention, the server 10 may communicate with the clients 12 over a transport 14. The transport 14 may be in accordance with an analog or digital broadcasting system. As one example, the transport 14 may be compliant with the Digital Video Broadcast (DVB); Network-independent Protocol, ETS 300802, dated November 1997 and available from the European Telecommunications Standards Institute (ETS), Valbonne, France. The transport 14 may be a satellite, cable or airwave broadcasting system as examples.

In accordance with embodiments of the present invention, the client 12 recognizes messages directed individually to that client 12 from the server 10 or in some embodiments, from other clients 12. Bandwidth may be conserved by addressing messages to a group of clients without the need to insert, within header, the individual identifiers of each of a large number of addressed clients.

In addition, the client 12 may include one or more addressable agents 44, 46 and 48 that may be independently addressed by remote units such as the server 10. Moreover, by providing addressable agents 44, 46 and 48 within a given client 12, messages that are specialized or which need specialized handling may be addressed to particular agents resident on the client 12 for appropriate handling.

The server 10 may include a software download and update server 16. The server 16 is responsible for transmitting software or software updates to the client 12. The server 16 transmits messages which include a distinct service identifier (e.g., service_id=0x01). The server 10 may also include an instant messaging or short message service (SMS) server 18 that also transmits messages having a distinct service identifier (e.g., service_id=0x02).

In addition, a client disk management server 20 may be provided as well. The client disk management server 20 may transmit messages that include one or more distinct service identifiers (e.g., service_id=x). In some cases, a variety of messages may be issued by the client disk management server 20 in order to initiate desired functions on a client's storage device or disk drive. For example, separate service identifiers may be utilized for the commands to create partitions, delete partitions, or modify partitions, as examples.

In accordance with one embodiment of the present invention, the server 10 may implement a unidirectional messaging system. In a unidirectional messaging system, the server 10 may transmit messages to a plurality of clients that are unable to respond in any way. One example of such a network is a direct-to-home (DTH) broadcast network that may be compliant with the DVB protocol. The network may use a connection oriented communication protocol or a real time connectionless communication protocol as two examples. There are many applications of unidirectional messaging from server to client such as instant messaging, command and control and notification and signaling, as examples. In other cases, the network may be a bidirectional network, for example with an Internet Protocol (IP) multicast backbone.

In one embodiment of the invention, the server 10 may include a unidirectional messaging server (UMS) 22 that is coupled to the servers 16, 18 and 20 to generate messages in an appropriate format. The messages transmitted by the UMS server 22 may include messages originally generated by one of the servers 16, 18 or 20. The UMS server 22 may then be coupled to an Internet Protocol multicast module 24 that places the messages in an appropriate multicast protocol format. Finally, a DVB Multiprotocol Encapsulation (MPE) 26 is coupled to the Internet protocol multicast module 24. The MPE is described in DVB Specification for Data Broadcasts (EN 301 192) and Specification for Service Information (SI) in DVB Systems (EN 300 468 V1.3.1 1998-02) both available from the ETS. The output of the DVB MPE 26 and a DVB-Service Information (SI) generator 28 are coupled to the transport 14. Service Information is digital data describing the delivery system, content and scheduling/timing of broadcast data streams.

In the client 12, the stream from the DVB-SI generator 28 is coupled to a DVB-SI receiver 40 and service acquisition module 38. The service acquisition module 38 extracts a program identifier (PID) and provides it to a DVB demultiplexer 32. A tuner 30 may tune the client 12 to the appropriate channel corresponding to the extracted program identifier.

The message from the DVB MPE 26 is provided to a DVB MPE receiver 42. The receiver 42 communicates with an IP multicast module 40 and a unidirectional messaging server 38. The server 38 breaks down the message to determine whether a service identifier was included in the data stream. If so, the message is forwarded to an appropriate agent designated to receive messages with particular service identifiers.

A disk management agent 44 may be coupled to a disk drive controller 47 in turn coupled to a storage device 45 that may, for example, be a hard disk drive. The disk management agent 44 may be addressed as a message recipient by the client disk management server 20. The disk management agent 44 may cause processes to be undertaken through the controller 47 that in turn control the use of the storage device 45. This control may include determining what information is stored on the storage device 45 and how that information is stored on the storage device 45.

In one embodiment of the present invention, the software download and update server 16 may provide a specific message identifier that causes its message to be received by a software download agent 48 tuned to a particular service identifier. Similarly, messages from the instant messaging server 18 may include a service identifier that cause those messages to be forwarded to an instant messaging agent 46 in the client 12. Likewise, messages from other servers 20 may have appropriate identifiers that cause them to be shunted to particular agents 44 on the client 12.

The server 10 may include a storage 25 that stores software 70 for controlling the operation of the server 22. Likewise, the server 38 on the client 12 may be coupled to a storage 45 that stores software 50 that controls the operation of the server 38. The servers 22 and 38 may also be processor-based systems.

Figure 2:
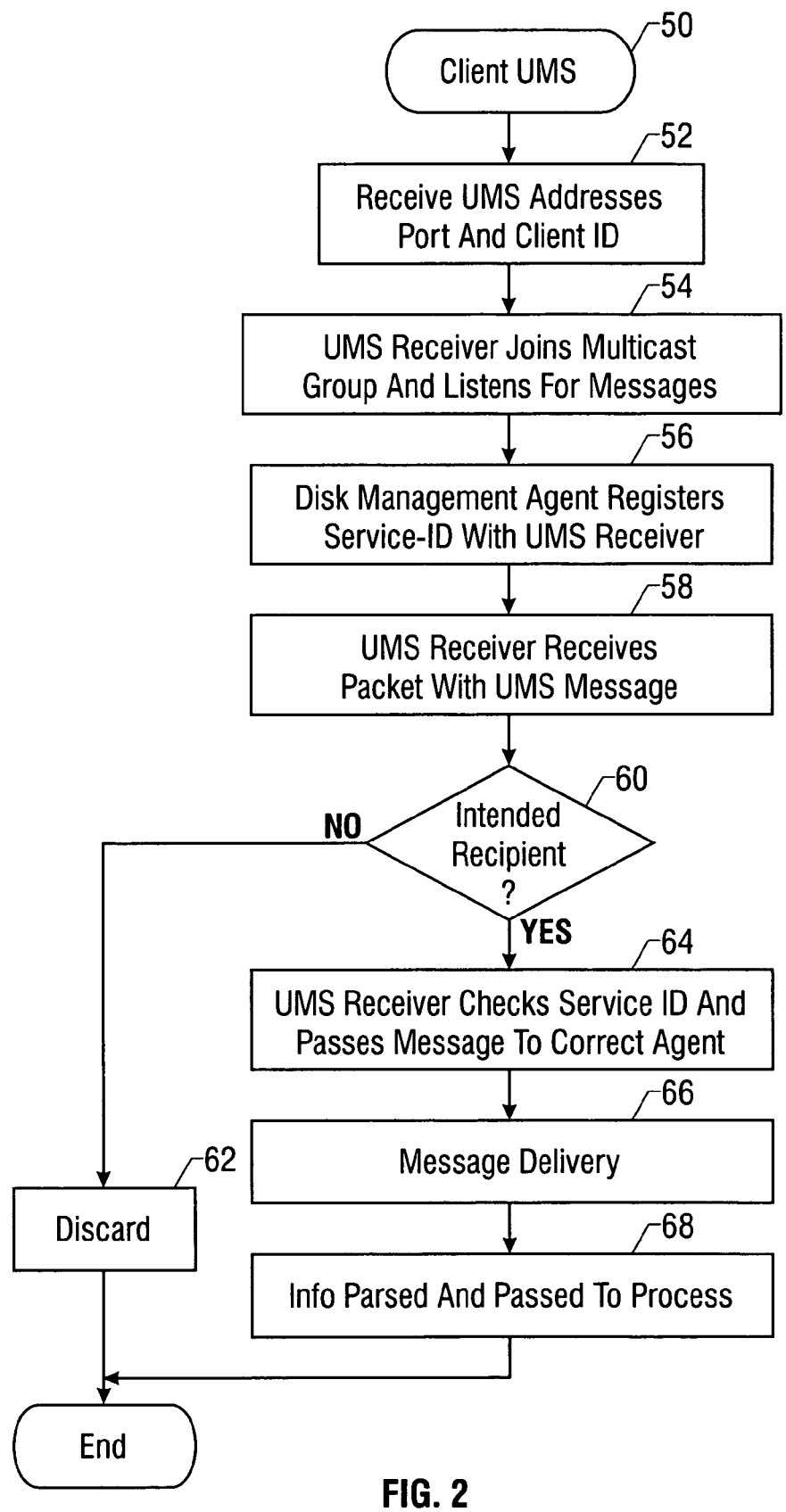
FIG. 2 is a flow chart for software resident on the client shown in FIG. 1 in accordance with one embodiment of the present invention.

Turning next to FIG. 2, the software 50 on the client 12 initially receives the unidirectional messaging server address and port from the server 10. The client 12 may also be assigned a client identifier as indicated in block 52. Thus, an Internet Protocol multicast system may be established wherein each client has a UMS address and port as well as a unique client identifier, assigned by the server 10. In some embodiments, the server 10 may adjust addresses and ports as well as client identifiers to enable communication of particular messages, message groups or types of messages to particular clients in a dynamic and reconfigurable fashion.

Having received its address, port and client identifier, the client 12 receiver joins a multicast group and listens for messages addressed specifically to it or to any groups that the client 12 belongs to, as indicated in block 54.

A disk management agent 44 registers its service identifier with the UMS server 38 as indicated in block 56. When the UMS server 38 receives a packet with a UMS message, as indicated in block 58, a check determines whether the particular client 12 is the intended recipient as indicated in diamond 60. If not, the message is discarded as indicated in block 62.

However, if the particular client 12 is the intended recipient, the server 38 checks the message's service identifier and passes the message to the correct agent 44, 46 or 48, as indicated in block 64. The message is then delivered to the appropriate agent 44, 46 or 48, as indicated in block 66. In the agent, the information is parsed and passed to an appropriate process for handling as indicated in block 68.

For example, when addressed, the disk management agent 44 sends appropriate commands to the controller 47 for relay to the storage device 45. Dependent on the service identifier accompanying the message, the agent 44 may provide appropriately translated commands to the controller 47 such as the commands to create a partition, delete a partition or modify a partition. Each of these commands may be given separate service identifier values such as 0x03, 0x04 and 0x05. The disk management agent 44 may translate a message with a service identifier value into an appropriate format for the controller 47 based on the message received from the client disk management server 20. For example, with a message that includes a service identifier value 0x03, the agent 44 may issue a command to the controller 47 to partition the storage 45.

Figure 3:
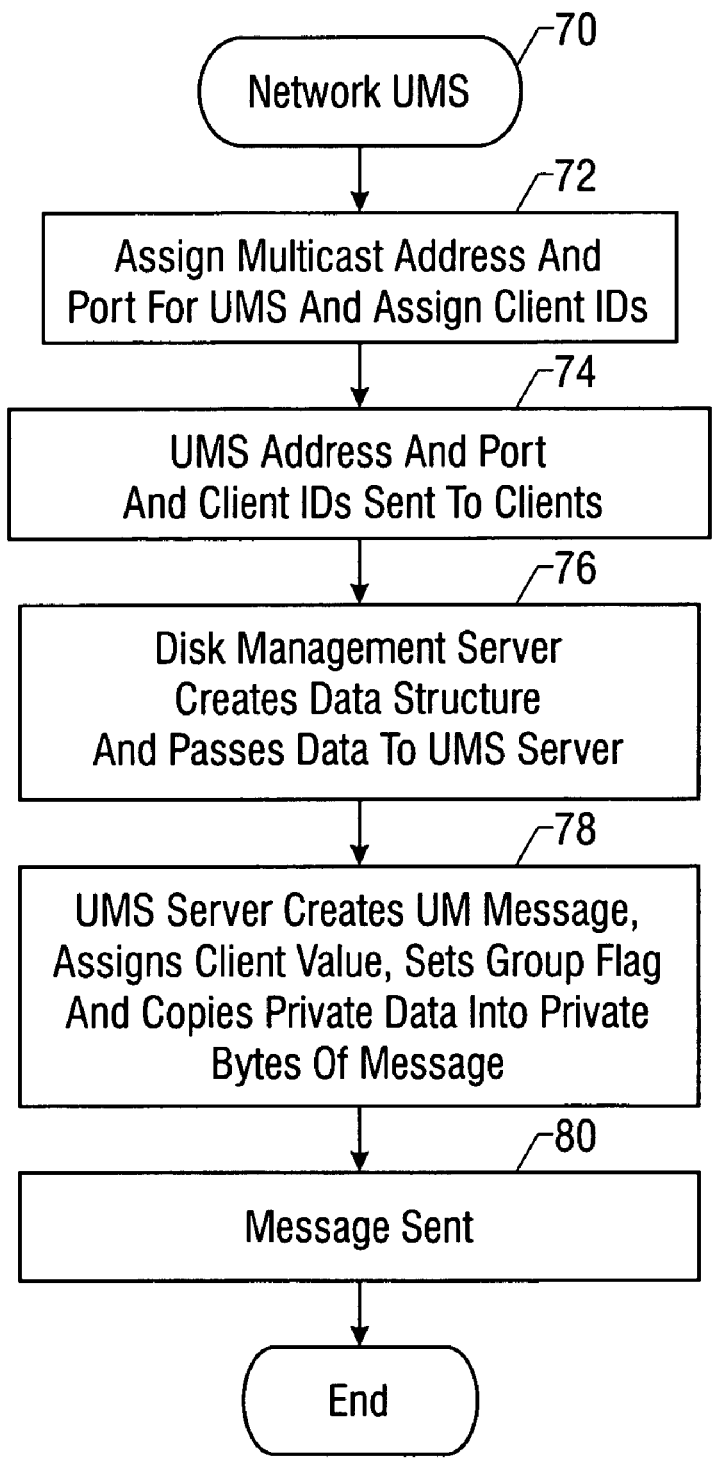
FIG. 3 is a flow chart for software resident on the server or head-end in accordance with one embodiment of the present invention.

On the server side, shown in FIG. 3, the network software 70 begins by assigning multicast addresses and ports for unidirectional messaging service to a plurality of clients 12 as indicated in block 72. The server 10 may also assign client identifiers in a dynamic and reconfigurable fashion. The address, port and client identifiers are then transmitted to the clients as indicated in block 74.

Thereafter, the disk management server 20 may create a data structure and pass this data structure to the server 22 as indicated in block 76. The server 22 creates a unidirectional message and assigns a client value, sets a group flag, and copies private data in the private bytes of the message as indicated in block 78. More particularly, a unique client identifier may be assigned. The client identifier may either be a particular preassigned client identifier or, as one example, may be zero when multiple clients are targeted. A group flag may be a Boolean value specifying whether the client identifier is a group mask or a particular identifier. A group mask is an identifier that identifies a subset of the clients 12 on the network. This subset may include a plurality of clients but less than the total number of addressable clients.

As one example of a unidirectional message header, the message may include a number of variables including a group_mask, a service_id, a version_id, a message_id, and a private_data_byte. The group_mask may, in one embodiment of the present invention, include 64 bits, the service_id may include eight bits, the version_id may include sixteen bits, the message_id may include eight bits and the private_data_byte may include eight bits. The group_mask may be exclusive ORed with the client identifier of each unique client 12 to determine if the client 12 is the intended recipient. The version_id is the version of the unidirectional messaging protocol and may initially be set to zero. The service_id may be a service identifier that may be as two examples 0x01 for a software and download and update service or 0x02 for an instant messaging service. Advantageously, the message size does not exceed 1,024 bytes in order to eliminate potential datagram fragmentation. The group_filter may be used in conjunction with the client_id field to limit the size of the private data bytes required for an application. Each of header items may include an unsigned integer most significant bit first (uimsbf) identifier in accordance with the DVB specification except for the private_data_byte which may include a bit string, left bit first (bslbf) identifier.

As indicated in block 80, the message is then sent to all the clients 12 on the network. Each client then determines whether the message is intended for that client. The client 12 determines whether it is the specific intended recipient by determining whether the message is addressed to the client identifier of the client 12. For example, using an AND logic operator between the message's identifier and the client's identifier, the client 12 may determine if the client 12 is within a group of clients jointly addressed by the server 10.

In one embodiment of the present invention, distinct groups of users may receive common client identifier elements. Thus, a plurality of clients whose owners have signed up for enhanced service may include a common code portion in their client identifier. When a message including that common code portion in the client identifier is received, each of those clients accepts the message. Likewise, clients in particular geographic areas, having particular interests or otherwise identifiable clients may be given unique prefixes/suffixes or identifier code portions. The code portion may be logically ANDed with a group_mask to determine whether a particular client is a member of the targeted group.

The management message header may also include fields to address the disk management agent 44, such as a volume_name_len field that provides the volume, name, length and bytes for the pertinent volume of a storage device 45 in the form of a hard disk drive. In one embodiment of the present invention, that field may be eight bits long and may be have a bslbf identifier. In addition, a volume_name_byte field may give the volume name bytes that make up the name of the volume to mount on which to create a partition. In one embodiment of the present invention, this field may be eight bits long and may include a bslbf identifier. Finally, a partition_size field may give the size of the partition to create in bytes. This field may be thirty-two bits in size and may use the uimsbf identifier. Of course, additional fields and additional service identifiers may be utilized to implement still additional commands to the client storage device 45.

In this way, the client disk management server 20, under the direction from the server or head-end 10, may control how the storage 45 is set up and utilized on a targeted client 12 or a targeted group of clients 12. Each of the clients 12 may be individually addressed, the entire set of clients may be addressed or any subgroup of clients may be collectively addressed such that their storage devices 45 may be individually or collectively modified. Thus, the storage devices 45 of one or more clients may be selectively controlled from the server 10.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving on a first client a message from a server addressed to said client;
   controlling management of data storage by said client based on information included in said message;
   defining a messaging service type and message identification to dynamically control storage for groups of clients or individual clients;
   assigning an individual identifier to the clients comprising a set of clients including said first client;
   assigning a group identifier to a subset of the clients within the set of clients; and
   enabling the first client in said set to determine whether a message is sent to the first client or to the subset.

2. The method of claim 1 further including sending a single message to a subset of said clients.

3. The method of claim 1 including sending television content to a plurality of clients.

4. The method of claim 1 wherein assigning an individual identifier includes assigning a code portion that identifies a particular client as belonging to a subset of clients within the set of clients.

5. The method of claim 4 including comparing a group identifier, received by a client with a message, to the client's individual identifier to determine whether the particular client is within the addressed subset.

6. The method of claim 1 including addressing the same message to a subset of clients.

7. The method of claim 1 including sending a message to a client in a unidirectional messaging system.

8. The method of claim 1 including receiving a message including an identifier which specifies a task to perform on a storage device.

9. The method of claim 8 including receiving a message including an identifier indicating a change to a partition on said storage device.

10. The method of claim 1 wherein controlling management of data storage includes controlling the organization of how data is stored by said client.

11. An article comprising a medium storing instructions that enable a processor-based system to:
    receive on a first client a message from a server addressed to said client;
    control management of data storage by said client based on information included in said message;
    define a messaging service type and message identification to dynamically control storage for groups of clients or individual clients;
    assign an individual identifier to a client comprising a set of clients;
    assign a group identifier to a subset of the client within the set of clients; and
    enable a first client in said set to determine whether a message is sent to the first client or to the subset.

12. The article of claim 11 further storing instructions that enable the processor-based system to send a single message to a subset of said clients.

13. The article of claim 11 further storing instructions that enable the processor-based system to send television content to a plurality of clients.

14. The article of claim 11 further storing instructions that enable the processor-based system to assign a code portion that identifies a particular client as belonging to a subset of clients within the set of clients.

15. The article of claim 14 further storing instructions that enable the processor-based system to compare a group identifier, received by a client with a message, to the client's individual identifier to determine whether the client is within the address subset.

16. The article of claim 11 further storing instructions that enable the processor-based system to address the same message to a subset of clients.

17. The article of claim 11 further storing instructions that enable the processor-based system to send a message to a client in a unidirectional messaging system.

18. The article of claim 11 further storing instructions that enable the processor-based system to decode a command within said message to modify the storage of information on a storage device.

19. The article of claim 18 further storing instructions that enable the processor-based system to modify a partition on said storage device in response to a command included within said message.

\* \* \* \* \*